United States Patent
Hoffner et al.

(10) Patent No.: US 10,827,389 B2
(45) Date of Patent: Nov. 3, 2020

(54) SYSTEMS AND METHODS FOR MODIFYING DATA USAGE PERMISSIONS BASED ON AN EVENT

(71) Applicant: Verizon Patent and Licensing Inc., Arlington, VA (US)

(72) Inventors: Barry F. Hoffner, Bridgewater, NJ (US); Lixia Yan, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 122 days.

(21) Appl. No.: 16/224,232

(22) Filed: Dec. 18, 2018

(65) Prior Publication Data

US 2020/0196198 A1 Jun. 18, 2020

(51) Int. Cl.
| | |
|---|---|
| *H04W 28/24* | (2009.01) |
| *H04W 8/20* | (2009.01) |
| *H04W 4/90* | (2018.01) |
| *H04W 48/04* | (2009.01) |
| *H04W 8/08* | (2009.01) |

(52) U.S. Cl.
CPC ............ *H04W 28/24* (2013.01); *H04W 4/90* (2018.02); *H04W 8/082* (2013.01); *H04W 8/20* (2013.01); *H04W 48/04* (2013.01)

(58) Field of Classification Search
CPC ...... H04W 28/24; H04W 48/04; H04W 8/082; H04W 8/20; H04W 4/90; H04L 47/24
See application file for complete search history.

(56) References Cited

U.S. PATENT DOCUMENTS

| | | | | |
|---|---|---|---|---|
| 9,843,914 | B1 * | 12/2017 | Rao .................. | H04W 4/90 |
| 2012/0320912 | A1 * | 12/2012 | Estrada ............... | H04W 4/08 370/389 |

\* cited by examiner

*Primary Examiner* — Pao Sinkantarakorn
*Assistant Examiner* — Kabir U Jahangir

(57) ABSTRACT

A device receives instructions to update a field that defines a coverage area within a network. The device updates, based on receiving the instructions, the field to include a set of identifiers that are associated with a group of base stations within the coverage area. The device determines that a user equipment (UE), that is connected to the network, qualifies for the expanded data usage permissions based on account information associated with the UE including a particular identifier that allows the UE to utilize the expanded data usage permissions. The device provides, to another device, a request for data usage information that reflects the expanded data usage permissions. The device causes the data usage information to be applied to the UE.

20 Claims, 11 Drawing Sheets

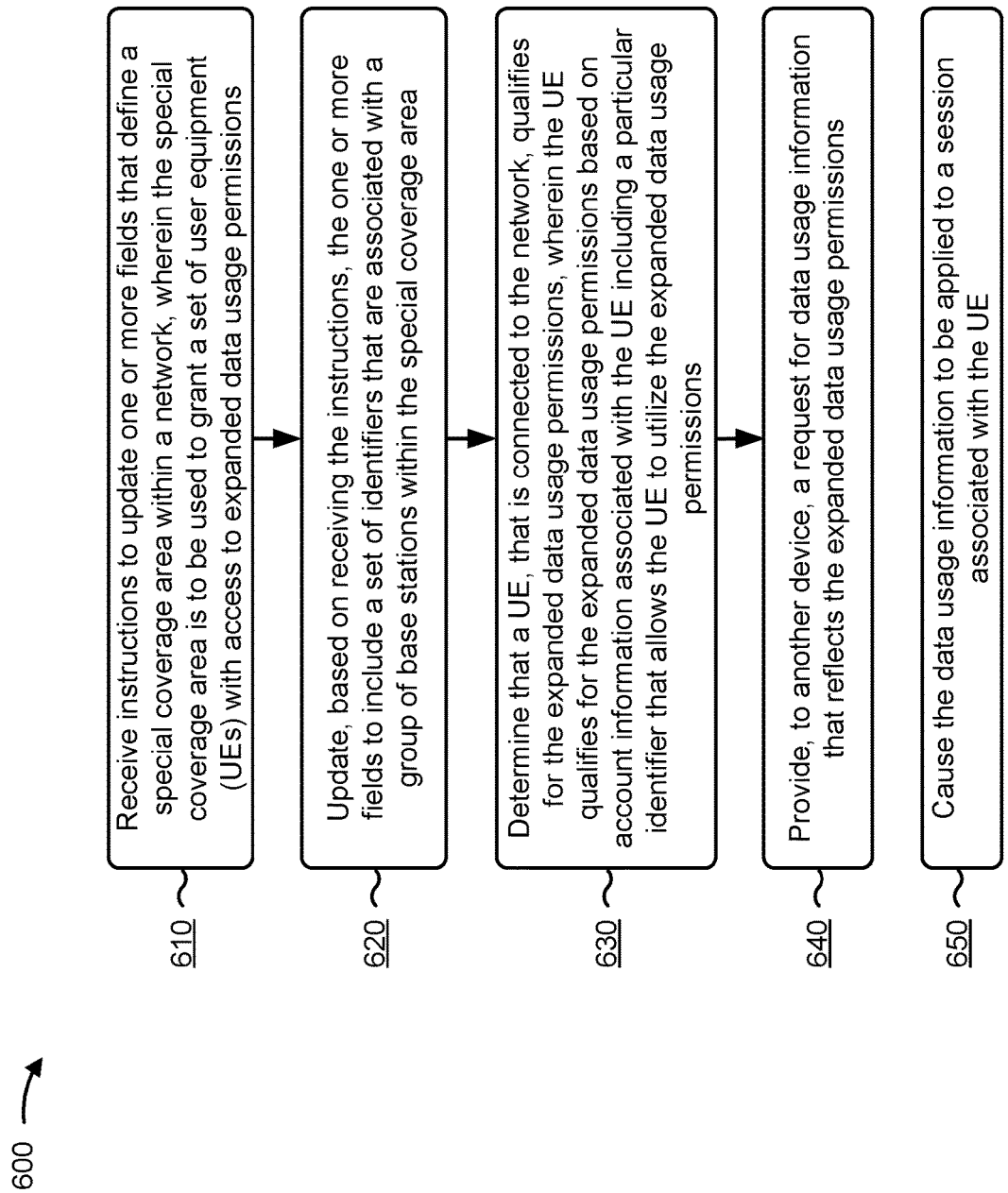

SYSTEMS AND METHODS FOR MODIFYING DATA USAGE PERMISSIONS BASED ON AN EVENT

BACKGROUND

A telecommunication provider may offer a service plan to a group of customers. The service plan may indicate an amount of data that may be used throughout a payment period. In some cases, an event, such as a natural disaster, may cause undue hardship to individuals located in an area of the natural disaster. In these cases, the telecommunication provider may offer free data to select customers, high-quality data to select customers, high-speed data to select customers, and/or the like, regardless of the data plan utilized by those customers. For example, if a natural disaster occurs, the telecommunication provider may offer free data, high-quality data, high-speed data, and/or the like, to first responders that are performing one or more disaster-relief tasks in or near a geographic area impacted by the natural disaster.

BRIEF DESCRIPTION OF THE DRAWINGS

FIG. 6 is a flow chart of an example process for providing a user equipment (UE) that is within a coverage area with expanded data usage permissions.

DETAILED DESCRIPTION OF PREFERRED EMBODIMENTS

Figure 1A:
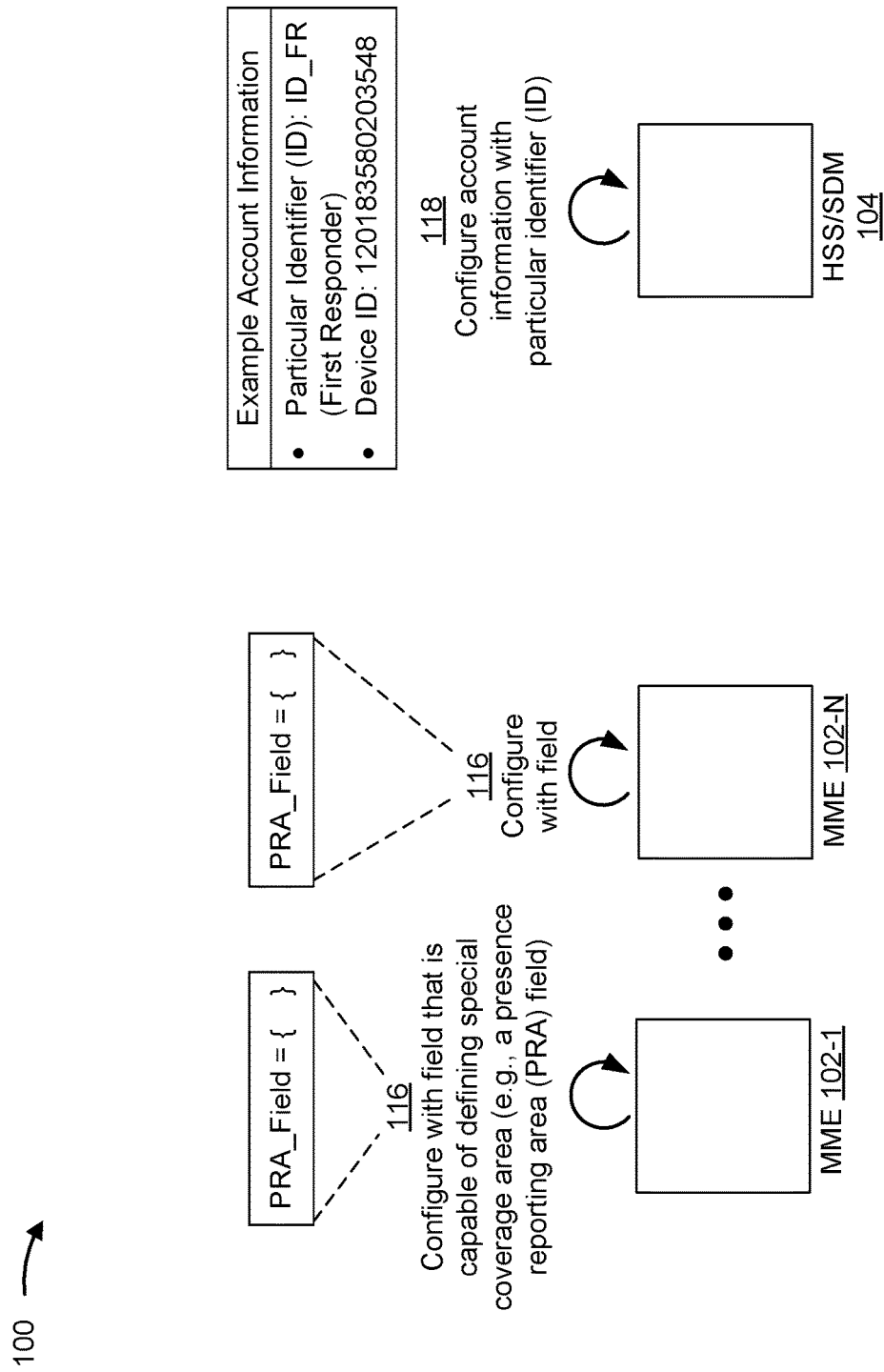
FIGS. 1A-1F are diagrams of one or more example implementations described herein.

The following detailed description of example implementations refers to the accompanying drawings. The same reference numbers in different drawings may identify the same or similar elements.

In some situations, an event may occur which may cause undue hardship to individuals located in a geographic area impacted by the event. In these situations, first responders may be dispatched to the geographic area to perform various disaster-relief tasks. If a first responder needs to use a network service to perform a task (e.g., making a phone call, using the Internet to look up a solution to a problem, and/or the like), and does not have data or minutes to perform the task, the first responder may be unable to perform the task and/or may be delayed in performing the task.

In some cases, telecommunication providers have been able to offer unrestricted data usage to select customers while an event is occurring. For example, if a natural disaster occurs, a telecommunication provider may be able to provide select first responders with the unrestricted data usage. One technique may involve identifying a set of UEs that have billing postal codes that are within a geographic area impacted by the natural disaster and providing the set of UEs with the unrestricted data usage. However, this technique is unable to provide all first responders in the geographic with unrestricted data usage. For example, if a team of first responders are from a geographic area outside of an area impacted by the natural disaster, and are dispatched to the geographic area impacted by the natural disaster, the technique would not be able to provide the team of first responders with unrestricted data usage because each of the first responders would have accounts with billing postal codes that are outside of the geographic area impacted by the natural disaster.

Some implementations described herein provide a device (e.g., a mobility management entity (MME) or another type of network device) to perform a set of actions that provide a UE with expanded data usage permissions while connected to a network during a time of crisis. For example, an MME may be configured with a field (e.g., a presence reporting area (PRA) field, etc.) that defines a coverage area within a network. When an event occurs, the MME may receive instructions to update the field with a set of identifiers that are associated with a group of base stations that are within a threshold distance of an area impacted by the event. The set of identifiers may include a set of base station identifiers, a set of area tracking identifiers, and/or the like, and may be used to define boundaries of the coverage area.

When the UE of a user (e.g., a first responder) enters the coverage area, the UE may initiate a connection request to establish a connection with the network. When the MME receives the connection request (e.g., from a base station), the MME may determine whether the UE qualifies for expanded data usage permissions. For example, the MME and/or a policy and charging rules function (PCRF) device may determine whether the UE qualifies for the expanded data usage permissions based on account information associated with the UE including a particular identifier that grants the UE with the expanded data usage permissions (e.g., an identifier indicating that the user is a first responder). If the UE qualifies for the expanded data usage permissions, the MME may interact with another network device (e.g., the PCRF device, etc.) to obtain data usage information that reflects the expanded data usage permissions. The data usage information may be used to provide the UE with an increase in a quantity of data available to the user (e.g., relative to the user's data plan), may provide access to data free of cost, may influence one or more quality of service (QoS) parameters to improve a quality of a connection to the network, may lift data throttling limitations, and/or the like. Additionally, the UE may interact with a serving base station to cause the data usage information to be applied to a session associated with the UE.

In this way, the MME identifies that the UE is to be given access to the expanded data usage permissions while the UE is within the coverage area. Additionally, by providing the UE with access to expanded data usage permissions, the user may be able to use one or more data services during a time of crisis or hardship. This could assist a first responder in saving human lives, allow the first responder to complete disaster-relief tasks more efficiently and effectively (thereby allowing the first responder to help more individuals during key moments of a crisis), and/or the like.

Furthermore, the MME conserves resources (e.g., processing resources, network resources, memory resources, and/or the like) by providing the UE with access to the expanded data usage permissions. For example, without access to the expanded data usage permissions, a user in an area impacted by an event may waste resources repeatedly making failed attempts to connect to the network, may waste resources by calling a telecommunication provider to inquire about receiving access to additional data usage, may waste resources by utilizing a slow network connection (e.g., which utilizes UE resources and network resources, while likely being too slow to help the user), and/or the like.

Additionally, the process described herein may be automated, which may remove human subjectivity and waste from the process, and which improves speed and efficiency of the process and conserve computing resources (e.g., processor resources, memory resources, and/or the like). For example, the MME (and/or one or more other devices described herein) may, without human intervention, automatically provide particular UEs with access to expanded data usage permissions. This eliminates a need for a network administrator to manually interact with a device to provide the particular UEs with the access to the expanded data usage permissions, thereby conserving resources of the device, reducing or eliminating chances of human error, and improving quality and efficiency of the process. Additionally, implementations described herein use a rigorous, computerized process to perform tasks or roles that were not previously performed or were previously performed using subjective human intuition or input.

FIGS. 1A-1F are diagrams of one or more example implementations 100 described herein. Example implementation(s) 100 may include a group of mobility management entities (MMEs) 102 (shown as MME 102-1, . . . , MME 102-N), a home subscriber server/subscriber data manager (HSS/SDM) 104, two user equipment (UE) 106 (referred to collectively as UEs 106 or UE 106-1 and UE 106-2, respectively), a base station 108, a serving gateway (SGW) 110, a packet data network gateway (PGW) 112, and a policy and charging rules function (PCRF) 114. One or more of these devices may communication via a network, such as a fifth generation (5G) network, a fourth generation (4G) long-term evolution (LTE) network, and/or a similar type of network. As shown in FIGS. 1A-1F, MME 102-1 may perform a set of actions to provide UEs 106 with expanded data usage permissions within the coverage area.

As shown in FIG. 1A, and by reference number 116, the group of MMEs 102 may be configured with a field that can include values that define a coverage area. For example, the group of MMEs 102 may be configured with a presence reporting area (PRA) field that may be populated with a set of identifiers that define a coverage area. In some cases, the set of identifiers may include a set of base station identifiers, a set of area tracking identifiers (e.g., a set of tracking area codes (TACs), a set of tracking area identities (TAIs)), and/or the like.

In some implementations, the set of identifiers may be used to define geographic boundaries of the coverage area (e.g., the set of identifiers may correspond to base stations that are each assigned a geographic area of coverage within the network). As an example, if the PRA field is updated to include a set of base station identifiers for a set of base stations, and each base station is assigned a geographic area of coverage, a total geographic area of coverage for the set of base stations may serve as the coverage area.

In some cases, MMEs 102 may configure a set of fields. For example, rather than have one PRA field that may include a set of identifiers, MMEs 102 might be configured such that a set of fields corresponds to the set of identifiers.

As shown by reference number 118, HSS/SDM 104 may configure account information associated with a group of UEs (e.g., a group of UEs that include UEs 106) with a particular identifier that serves as an indicator that the group of UEs are eligible for receiving expanded data usage permissions, as described further herein. The particular identifier may be represented by a value, a flag, a message, an absence of a value or flag or message, and/or the like. The particular identifier may be associated with a particular UE, associated with a particular user, associated with an account, and/or the like. The group of UEs may be accessible to users may be a group of users who have been identified as eligible to take advantage of expanded data usage permissions within the coverage area, such as a group of first responders, a group of individuals affected by events such as natural disasters, and/or the like.

As an example, to identify first responders, a telecommunication provider may interact with one or more public safety departments to identify a list of subscriber profiles that are first responders. In this case, HSS/SDM 104 may configure the subscriber profile information, for users included in the list, to include the particular identifiers. This may allow UEs 106 associated with the first responders to be marked as being eligible for expanded data usage permissions, as described further herein.

In this way, the group of MMEs 102 may be configured with the field that can be used to define the coverage area and HSS/SDM 104 may configure the subscriber profiles with the particular identifier that indicates which users are eligible for expanded data usage permissions within the coverage area.

Figure 1B:
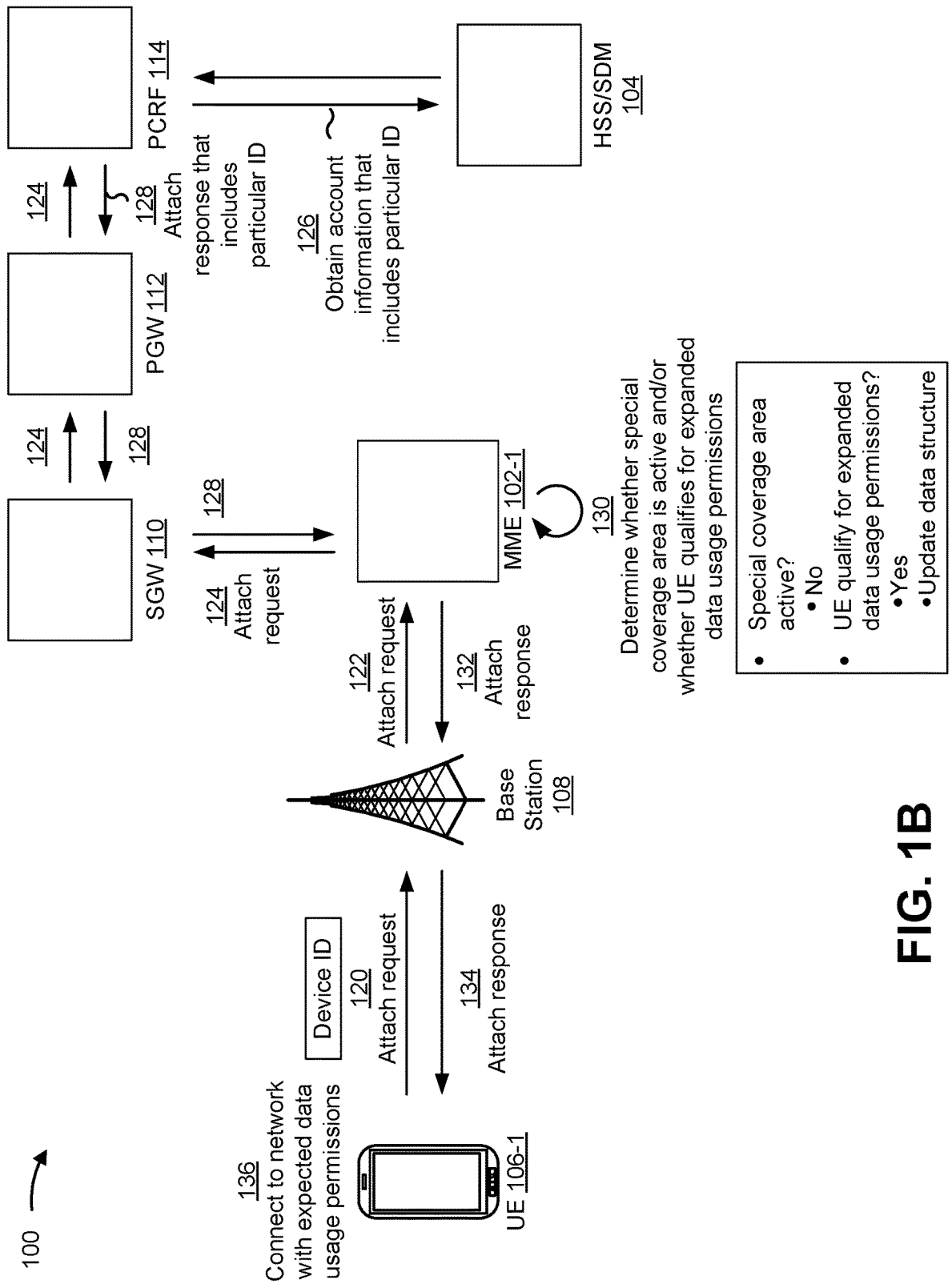

As shown in FIG. 1B, and by reference number 120, UE 106-1 may provide a connection request (e.g., an attachment request) to base station 108. For example, UE 106-1 may enter an area of coverage of base station 108 and may provide a connection request to base station 108 based on UE 106-1 powering on, returning from an idle state, enabling a network connection feature, moving into range of base station 108, and/or the like. The connection request may include device information of UE 106-1, such as a device identifier (e.g., an international mobile equipment identity (IMEI) number, an international mobile subscriber identity (IMSI) number, a mobile subscriber mobile station international (MSISDN) number, a unique device identifier (UDID), etc.) and/or other information that may be used to establish a connection with the network.

As shown by reference number 122, base station 108 may provide the connection request to MME 102-1. As shown by reference number 124, MME 102-1 may provide the connection request to PCRF 114. For example, MME 102-1 may provide the connection request to SGW 110, which may provide the connection request to PGW 112, which may provide the connection request to PCRF 114. As shown by reference number 126, PCRF 114 may obtain subscriber profile information for a user associated with UE 106-1. In some cases, PCRF 114 may analyze the subscriber profile information to determine that the subscriber profile information includes a particular identifier (e.g., an identifier assigned to a subscriber profile of a first responder). Additionally, PCRF 114 may include the particular identifier as part of a connection response.

As shown by reference number 128, PCRF 114 may provide, to MME 102-1, the connection response that includes the device identifier and/or the particular identifier. For example, PCRF 114 may provide the connection response to PGW 112, which may provide the connection response to SGW 110, which may provide the connection response to MME 102-1.

As shown by reference number 130, MME 102-1 may determine whether the coverage area is active and/or may determine whether UE 106-1 qualifies for expanded data usage permissions. For example, MME 102-1 may determine whether the coverage area is active by analyzing the field to determine whether the field includes identifiers associated with particular base stations. In the example shown, MME 102-1 may analyze the field to determine that the field includes null values (or no values). The null values (or lack of identifier values) may be an indicator that coverage area is not active (e.g., because an event, such as a natural disaster, has not occurred, and thus the coverage area has yet to be activated).

In some implementations, MME 102-1 may determine whether UE 106-1 qualifies for the expanded data usage permissions. For example, MME 102-1 may analyze contents of the connection response, and may determine that UE 106-1 qualifies for the expanded data usage permissions based on the connection response including the particular identifier.

Expanded data usage permissions, as used herein, may refer to expanded data usage permissions relative to a data plan of a user associated with a UE (e.g., UE 106-1, UE 106-2, etc.). The data usage permissions may be expanded by modifying data usage information that influences access to data while the UE is connected to the network, charges for data usage, availability of particular quality of service (QoS) features, and/or the like. Data usage information, as used herein, may include information indicating a quantity of data that may be provided to the UE, information indicating an amount of data that may be provided free of cost, information indicating to remove one or more data restrictions that may be applicable to the UE (e.g., information indicating to remove one or more data throttling restrictions, such that data usage of a session is not restricted to a particular speed or a particular bandwidth), information indicating to modify one or more QoS parameters that affect the quality of the UE's connection (e.g., such as by increasing an amount of bandwidth available to the UE, removing a restriction on the amount of bandwidth available to the UE, etc.), and/or the like.

In some implementations, MME 102-1 may update a data structure to store a record indicating that UE 106-1 qualifies for the expanded data usage permissions. The data structure may, for example, associate a device identifier of UE 106-1 and the particular identifier. This may allow MME 102-1 to keep a local record that indicates that UE 106-1 qualifies for the expanded data usage permissions. The local record may be kept for all (or some) UEs that are presently connected to the network via MME 102-1. In this way, if the coverage area is activated while one or more of the UEs are still connected to the network, MME 102-1 may be able to immediately interact with one or more network devices (e.g., PCRF 114, etc.) to request that the UEs be given the expanded data usage permissions, as described further herein.

As shown by reference number 132, MME 102-1 may provide the connection response to base station 108. As shown by reference number 134, base station 108 may provide the connection response to UE 106-1.

In this way, and as shown by reference number 136, UE 106-1 is able to connect to the network with expected data usage permissions (e.g., as indicated in the data plan of the user).

Figure 1C:
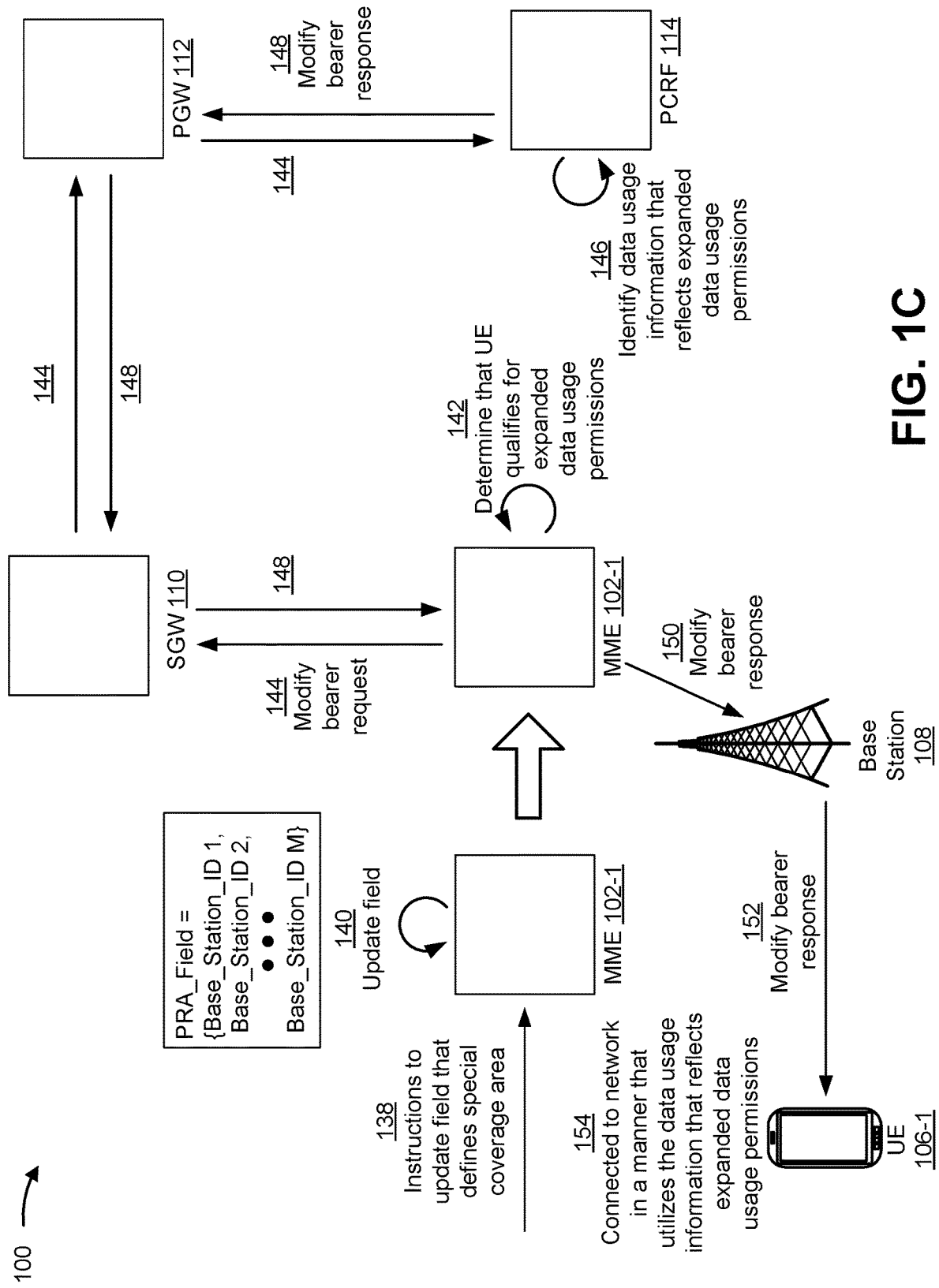

As shown in FIG. 1C, and by reference number 138, MME 102-1 may receive instructions to update the field (e.g., the PRA field) that defines the coverage area within the network. For example, an event may occur that causes an authorized user of a telecommunication provider to generate and provide MME 102-1 with instructions to update the field. The instructions may include, for example, a set of identifiers that may be used to define a set of geographic boundaries of the coverage area. For example, the set of identifiers may be associated with a set of base stations that each have a pre-determined area of coverage. In this case, the set of identifiers may be used to define a geographic area that is equal to the area of coverage of the set of base stations. The set of identifiers may include a set of base station identifiers, a set of area tracking identifiers that correspond to areas serviced by particular base stations (e.g., a set of TACs, a set of TAIs, etc.), and/or the like.

In some implementations, the instructions may be provided to MME 102-1 based on an event. An event, as used herein, may refer to an act, situation, and/or the like, that causes undue hardship to a class of users, which may create a need for data services in an area impacted by the event. The event may be a natural disaster, a power outage, a situation where one or more network devices of a service area have reached maximum capacity (e.g., if too many users are on the network in a particular area, connections may be slowed, and first responders or other important individuals may be unable to access data services), and/or the like.

As an example, one or more managers that work for a telecommunication provider may identify that an event is occurring and may determine that an area impacted by the event may need to be a coverage area. In this example, the one or more managers may give an authorized user (e.g., a network administrator) permission to generate and provide MME 102-1 with instructions to update the field that defines the coverage area.

While the example described here provides one MME (e.g., MME 102-1) receiving the instructions, in practice, the coverage area may extend to a geographic region that is serviced by multiple MMEs 102 (e.g., in which case the instructions may be provided to each of the MMEs 102).

As shown by reference number 140, MME 102-1 may update the field. For example, MME 102-1 may update the field (e.g., the PRA field) based on receiving the instructions. In this case, MME 102-1 may process the instructions to identify the set of identifiers and may include the set of identifiers as values within the field.

As shown by reference number 142, MME 102-1 may determine that UE 106-1 qualifies for the expanded data usage permissions. For example, MME 102-1 may have determined that UE 106-1 qualifies for the expanded data usage permissions when UE 106-1 initially connected to the network. As such, MME 102-1 may simply reference the data structure described above to determine that the device identifier associated with UE 106-1 is stored in association with the particular identifier that indicates that a user associated with UE 106-1 is eligible for the expanded data usage permissions.

In some implementations, MME 102-1 (or another network device) may automatically update the field. For example, if a national weather service issues a weather warning for an area (e.g., a hurricane, a tornado, a wildfire, and/or the like), MME 102-1 (or the other network device) may receive data identifying the weather warning. As an example, MME 102-1 may receive the data based on subscribing to be a recipient that is to be automatically provided weather warnings, may obtain the data based on analyzing a website or data source that broadcasts the weather warning, and/or the like. Additionally, MME 102-1 may analyze the data identifying the weather warning to determine whether to update the field. For example, MME 102-1 may determine a degree of severity of the weather warning by analyzing the data using one or more natural language processing techniques and may determine whether to update the field based on whether a value representing the degree of severity of the weather warning satisfies a threshold value.

In this way, MME 102-1 may update the field without receiving the instructions from a device operated by a human user.

In some implementations, MME 102-1 may not store a local record that indicates that UE 106-1 qualifies for the expanded data usage permissions. For example, MME 102-1 may provide a request to PCRF 114 for an indication of whether UE 106-1 qualifies for the expanded data usage permissions. In this case, PCRF 114 may obtain the subscriber profile information for the user associated with UE 106-1 to determine whether the subscriber profile information includes the particular identifier (e.g., the identifier assigned to a subscriber profile of a first responder). Additionally, PCRF 114 may provide a message to MME 102-1 indicating that UE 106-1 qualifies for the expanded data usage permissions.

As shown by reference number 144, MME 102-1 may provide a request (e.g., a modify bearer request) to PCRF 114. For example, MME 102-1 may provide a modify bearer request to PGW 110, SGW 110 may provide the modify bearer request to PGW 112, and PGW 112 may provide the modify bearer request to PCRF 114. The modify bearer request may include the device identifier, the particular identifier, an indication that UE 106-1 qualifies for the expanded data usage permissions, a request for the data usage information that reflects the expanded data usage permissions, and/or the like.

As shown by reference number 146, PCRF 114 may identify the data usage information that reflects the expanded data usage permissions. For example, PCRF 114 may be configured with the data usage information that reflects the expanded data usage permissions, and may, upon receiving the request, identify the data usage information that is to be offered to UE 106-1.

As shown by reference number 148, PCRF 114 may provide, to MME 102-1, a response (e.g., a modify bearer response) that includes the data usage information that has been identified. For example, PCRF 114 may provide the modify bearer response to PGW 112, PGW 112 may provide the modify bearer response to SGW 110, and SGW 110 may provide the modify bearer response to MME 102-1. As shown by reference number 150, MME 102-1 may provide the response to base station 108, and, as shown by reference number 152, base station 108 may provide the response to UE 106-1.

In this way, and as shown by reference number 154, UE 106-1 may be connected to the network in a manner that utilizes the data usage information that reflects the expanded data usage permissions. To provide an example, if UE 106-1 had a data plan that allows for two gigabytes (GB) a month of data use, and UE 106-1 had already used all two GB of the data, UE 106-1 may be unable to access data services in an area impacted by the event (e.g., unless a Wi-Fi hotspot was available and in a vicinity of UE 106-1). However, after receiving the response from base station 108, UE 106-1 may have been effectively switched to an unlimited data plan, such that the user may use UE 106-1 for data services, despite having previously used all available data that was provided as part of the user's data plan.

Figure 1D:
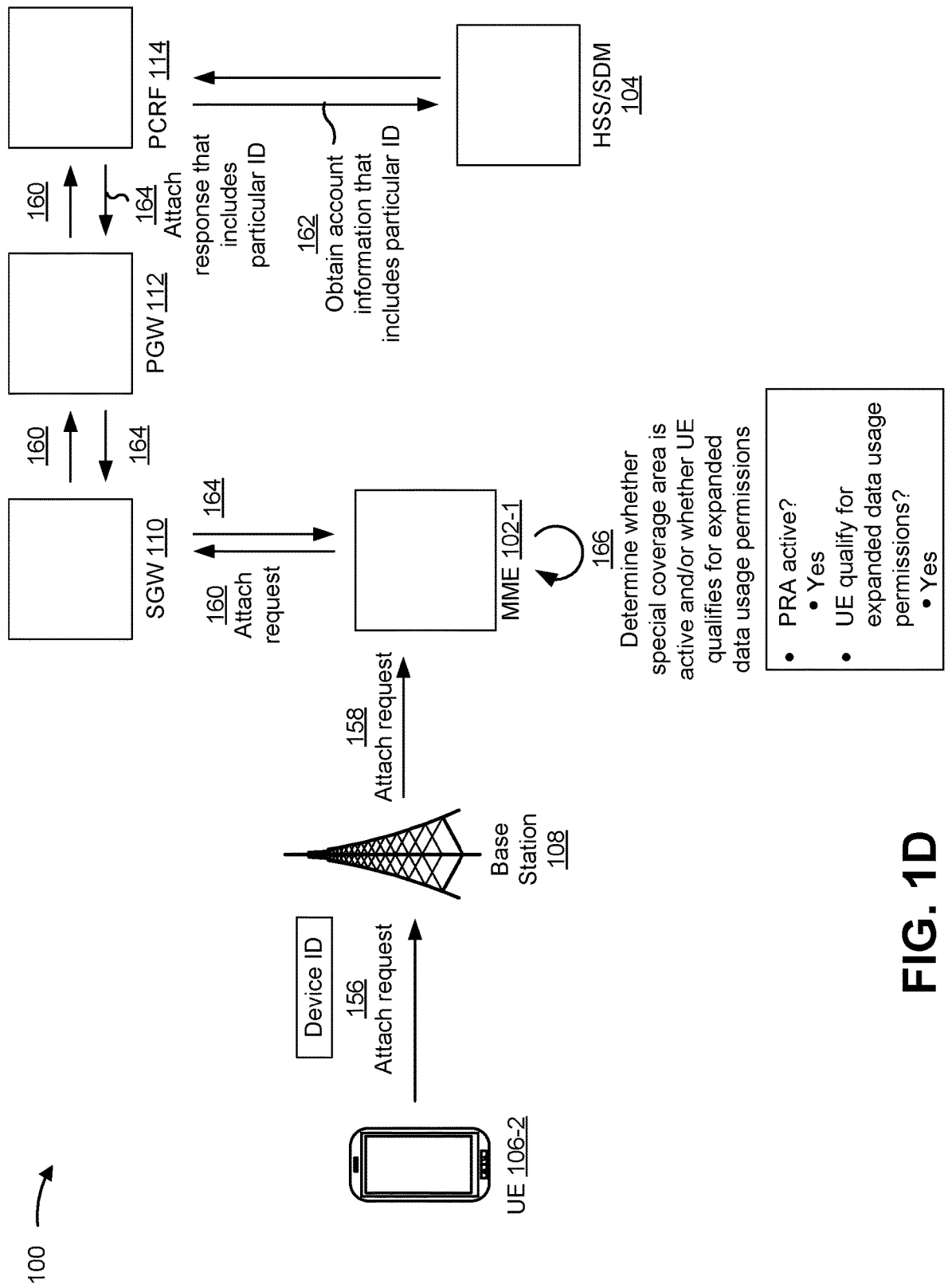
Figure 1E:
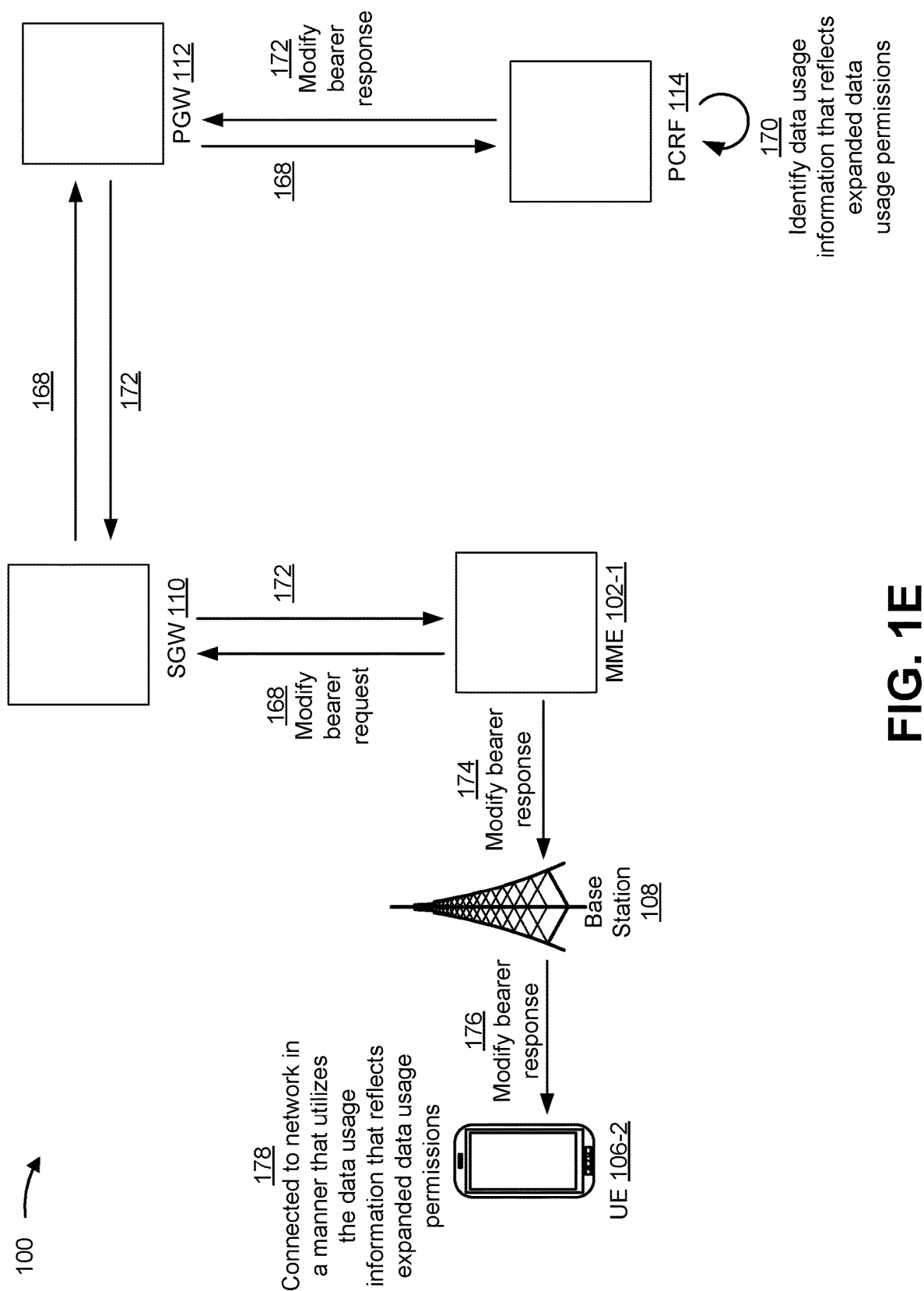

FIGS. 1D and 1E show an example process of a second UE (UE 106-2) that qualifies for the expanded data usage permissions but that connects to the network after the coverage area has been activated (whereas UE 106-1 had connected to the network prior to the coverage area being activated).

As shown in FIG. 1D, and by reference number 156, UE 106-2 may provide a connection request (e.g., an attachment request) to base station 108. As indicated above, the connection request may be provided after the coverage area has been activated. The connection request may include a device identifier of UE 106-2.

As shown by reference number 158, base station 108 may provide the connection request to MME 102-1. In some implementations, despite that UE 106-2 is attempting to initiate a connection to the network, MME 102-1 may reference the data structure to determine whether UE 106-2 qualifies for the expanded data usage permissions. For example, MME 102-1 may save values stored via the data structure for a threshold time period after particular UEs 106 disconnect from the network, such that if a particular UE 106 reconnects to the network within the threshold time period, MME 102-1 will still have a local record to reference that indicates whether the particular UE 106 qualifies for the expanded data usage permissions.

As shown by reference number 160, MME 102-1 may provide the connection request to PCRF 114. For example, MME 102-2 may provide the connection request to SGW 110, SGW 110 may provide the connection request to PGW 112, and PGW 112 may provide the connection request to PCRF 114. As shown by reference number 162, PCRF 114 may obtain, from HSS/SDM 104, the account information that includes a particular indicator (e.g., an identifier indicating that a user associated with UE 106-2 is a first responder and thus qualifies for the expanded data usage permissions). As shown by reference number 164, PCRF 114 may provide, to MME 102-1, a connection response that includes the particular identifier. For example, PCRF 114 may provide the connection response to PGW 112, PGW 112 may provide the connection response to SGW 110, and SGW 110 may provide the connection response to MME 102-1.

As shown by reference number 166, MME 102-1 may determine whether the coverage area is active and/or whether UE 106-2 qualifies for the expanded data usage permissions. For example, MME 102-1 may determine that the coverage area is active in a manner described elsewhere herein (e.g., by analyzing values of the field that defines the coverage area). Additionally, MME 102-1 may determine that UE 106-2 qualifies for the expanded data usage permissions in a manner described elsewhere herein (e.g., based on the connection response including the particular identifier). In some implementations, MME 102-1 may update the data structure to associate the device identifier of UE 106-2 and the particular identifier, in a manner similar to that described elsewhere herein.

In this way, MME 102-1 is able determine that UE 106-2 qualifies for the expanded data usage permissions, even when UE 106-2 connects to the network after the coverage area is activated.

As shown in FIG. 1E, and by reference number 168, MME 102-1 may provide, to PCRF 114, a request (e.g., a modify bearer request) for the data usage information that reflects the expanded data usage permissions. As shown by reference number 170, PCRF 114 may identify the data usage information that reflects the expanded data usage permissions, as further described elsewhere herein. As shown by reference number 172, PCRF 114 may provide, to MME 102-1, a response (e.g., a modify bearer response) that includes the data usage information.

In some implementations, as shown above, MME 102-1 may provide two separate requests (e.g., the connection request described in connection with reference number 160 and the modify bearer request described in connection with reference number 168). This is because MME 102-1 does not know whether UE 106-2 is eligible for the expanded data usage permissions at the time that UE 106-2 provides the connection request. In some implementations, rather than provide two separate requests, MME 102-1 may provide, with the connection request, conditional instructions that could cause PCRF 114 to provide the data usage information with the connection response (e.g., instead of having to send a separate modify bearer request, as showed in connection with reference number 168). The conditional instructions may, for example, be conditioned upon PCRF 114 verifying that the subscriber profile information for the user associated with UE 106-2 includes the particular identifier. This conserves resources (e.g., processing resources, network resources, memory resources, and/or the like) by eliminating a need to send two separate requests.

As shown by reference number 174, MME 102-1 may provide base station 108 with the response (e.g., the modify bearer response). For example, the response may be provided using a protocol associated with an evolved packet system, such as by using a non-access stratum (NAS) protocol to send a downlink NAS message. As shown by reference number 176, base station 108 may provide UE 106-2 with the response. For example, the response may be provided as part of a reconfiguration message using a radio resource control (RRC) protocol.

In this way, and as shown by reference number 178, UE 106-2 may be connected to the network in a manner that utilizes the data usage information that reflects the expanded data usage permissions.

Figure 1F:
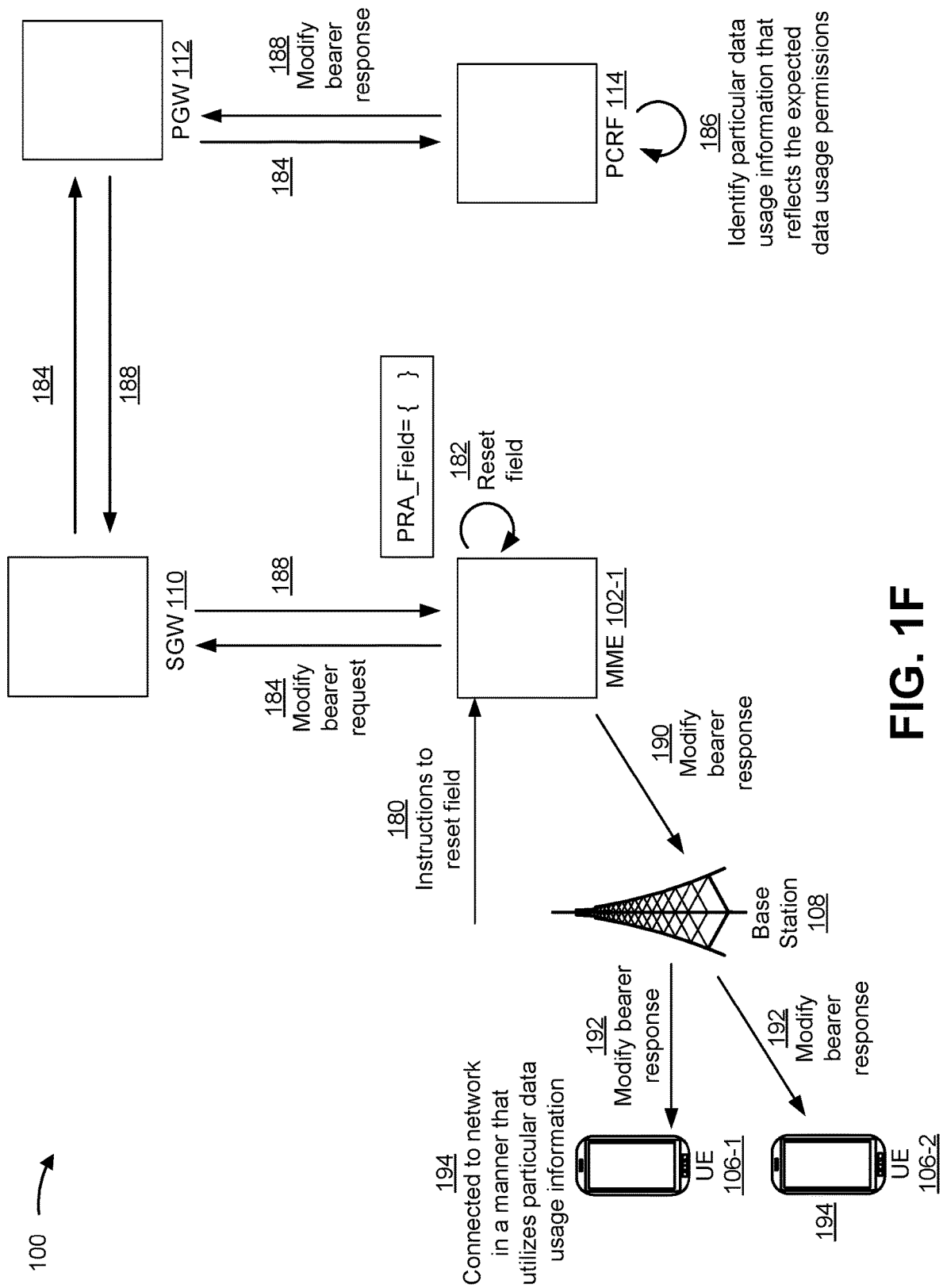

As shown in FIG. 1F, MME 102-1 may perform one or more actions that cause sessions (e.g., data sessions) utilized by UE 106-1 and UE 106-2 to be limited by the expected data usage permissions (e.g., data usage permissions identified in data plans of each respective user). For example, and as shown by reference number 180, MME 102-1 may receive instructions to reset at least one of the one or more fields that define the coverage area. The instructions may be provided to MME 102-1 when the coverage area is no longer needed, when a portion of the coverage area is no longer needed, and/or the like. In these cases, the instructions may indicate to reset the entire field (e.g., by clearing the set of indicators represented as values within the field), to reset some of the values included within the field (e.g., by clearing a subset of the set of indicators), and/or the like.

In some implementations, the instructions may be provided to MME 102-1 from a device associated with an authorized user. For example, after a natural disaster occurs, and first responders have completed disaster-relief tasks, a network administrator of a telecommunication provider may provide MME 102-1 with instructions indicating to reset values included in the field. As another example, MME 102-1 may automatically reset the field. For example, if the national weather service issues a broadcast that there is no longer a weather warning for an area, MME 102-1 (or another network device) may, upon receiving data identifying the contents of the broadcast, analyze the contents to determine to reset the field.

As shown by reference number 182, MME 102-1 may reset the field. For example, MME 102-1 may reset a PRA field by removing at least a portion of the set of indicators associated with the set of base stations from the PRA field. Resetting a field may refer to deleting the indicator value from memory, replacing the indicator value with a null value, and/or the like.

As shown by reference number 184, MME 102-1 may provide one or more requests (e.g., one or more modify bearer requests) for particular data usage information that reflect the expected data usage permissions of UE 106-1 and UE 106-2. For example, MME 102-1 may provide the one or more requests to SGW 110, SGW 110 may provide the one or more requests to PGW 112, and PGW 112 may provide the one or more requests to PCRF 114. As mentioned elsewhere herein, the expected data usage permissions may refer to data usage permissions indicated by a data plan of a particular user. The request may include one or more device identifiers (e.g., a device identifier of UE 106-1 and/or a device identifier of UE 106-2) that one or more other network devices (e.g., PCRF 114, HSS/SDM 104, etc.) may use to look up the expected data usage permissions of each respective user, as described below.

In some cases, MME 102-1 may provide a separate request for each UE 106 (e.g., a first request for UE 106-1, a second request for UE 106-2, etc.). In other cases, MME 102-1 may provide a single request for multiple UEs 106 (e.g., a request for particular data usage information for both UE 106-1 and UE 106-2).

As shown by reference number 186, PCRF 114 may identify the particular data usage information that reflects the expected data usage permissions. For example, PCRF 114 may identify the identify the particular data usage information that reflects the expected data usage permissions, such that a quantity of data, a limit to a quantity of data, a bandwidth range, and/or the like, that is being offered to the UEs 106 may be replaced by values indicated by data plans of the users. In this case, PCRF 114 may use the one or more device identifiers included in the request to look up the subscriber profile information for each respective user, which may include the expected data usage permissions as indicated by each respective user's data plan.

As shown by reference number 188, PCRF 114 may provide, to MME 102-1, one or more responses (e.g., one or more modify bearer responses) that include the particular data usage information. For example, PCRF 114 may provide the one or more requests to PGW 112, PGW 112 may provide the one or more requests to SGW 110, and SGW 110 may provide the one or more requests to MME 102-1. As shown by reference number 190, MME 102-1 may provide the one or more responses to base station 108 (i.e., the serving base station). For example, the one or more responses may be provided using a protocol associated with an evolved packet system, such as by using a NAS protocol to send a downlink NAS message. As shown by reference number 192, base station 108 may provide the one or more responses to each respective UE 106. For example, the one or more responses may be provided as part of a reconfiguration message using a radio resource control (RRC) protocol.

As shown by reference number 194, UEs 106 may be connected to the network in a manner that utilizes the particular data usage information. As such, the sessions that are active may now be restricted based on a type of data plan used by the users, based on a current amount of available data that the users have remaining in a particular billing cycle, and/or the like. In this way, users, such as first responders, are able to use their data plans when the coverage area is inactive and are able to take advantage of the expanded data usage permissions when the coverage area is active.

In some implementations, MME 102-1 may add new indicators to the field. For example, MME 102-1 may receive instructions to add new indicators as values of the field to increase a geographic area covered by the coverage area.

In some implementations, UE 106-1 or UE 106-2 may move from a service area covered by a first base station 108 (e.g., a serving base station 108) to a service area covered by a second base station 108 (e.g., a target base station). In this case, the first base station 108 may interact with the second base station 108 (referred to as a target base station 108) to perform a handover procedure, such that the second base station 108 is able to become a new serving base station 108. During (or before) the handover procedure, the first base station 108 may interact with MME 102-1 to determine whether the second base station 108 is within the coverage area. If not, MME 102-1 may perform one or more actions described elsewhere herein to ensure that, after the handover procedure is completed, that UE 106-1 or UE 106-2 are to be connected to the network in a manner that utilizes particular data usage information that corresponds to the expected data usage permissions.

In this way, MME 102-1 is able to identify that UEs 106 are to be given access to the expanded data usage permissions while the UEs 106 are within the coverage area. Additionally, by providing the UEs 106 with access to expanded data usage permissions, respective users of the UEs 106 may be able to use one or more data services during a time of crisis or hardship. This could assist a user in saving human lives, allow the user to complete disaster-relief tasks more efficiently and effectively (thereby allowing the user to help more individuals during key moments of a crisis), and/or the like.

Furthermore, MME 102-1 conserves resources (e.g., processing resources, network resources, memory resources, and/or the like) by providing the UEs 106 with access to the expanded data usage permissions. For example, without access to the expanded data usage permissions, a user in an area impacted by the event may waste resources repeatedly making failed attempts to connect to the network, may waste resources by calling a telecommunication provider to inquire about receiving access to additional data usage, may waste resources by utilizing a slow network connection (e.g., which may utilize resources of a particular UE 106 and/or network resources, while likely being too slow to help the user), and/or the like.

As indicated above, FIGS. 1A-1F are provided merely as an example. Other examples may differ from what was described with regard to FIGS. 1A-1F. For example, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple and/or distributed devices. Additionally, or alternatively, a set of devices (e.g., one or more devices) of example implementation(s) 100 may perform one or more functions described as being performed by another set of devices of example implementation(s) 100.

Figure 2:
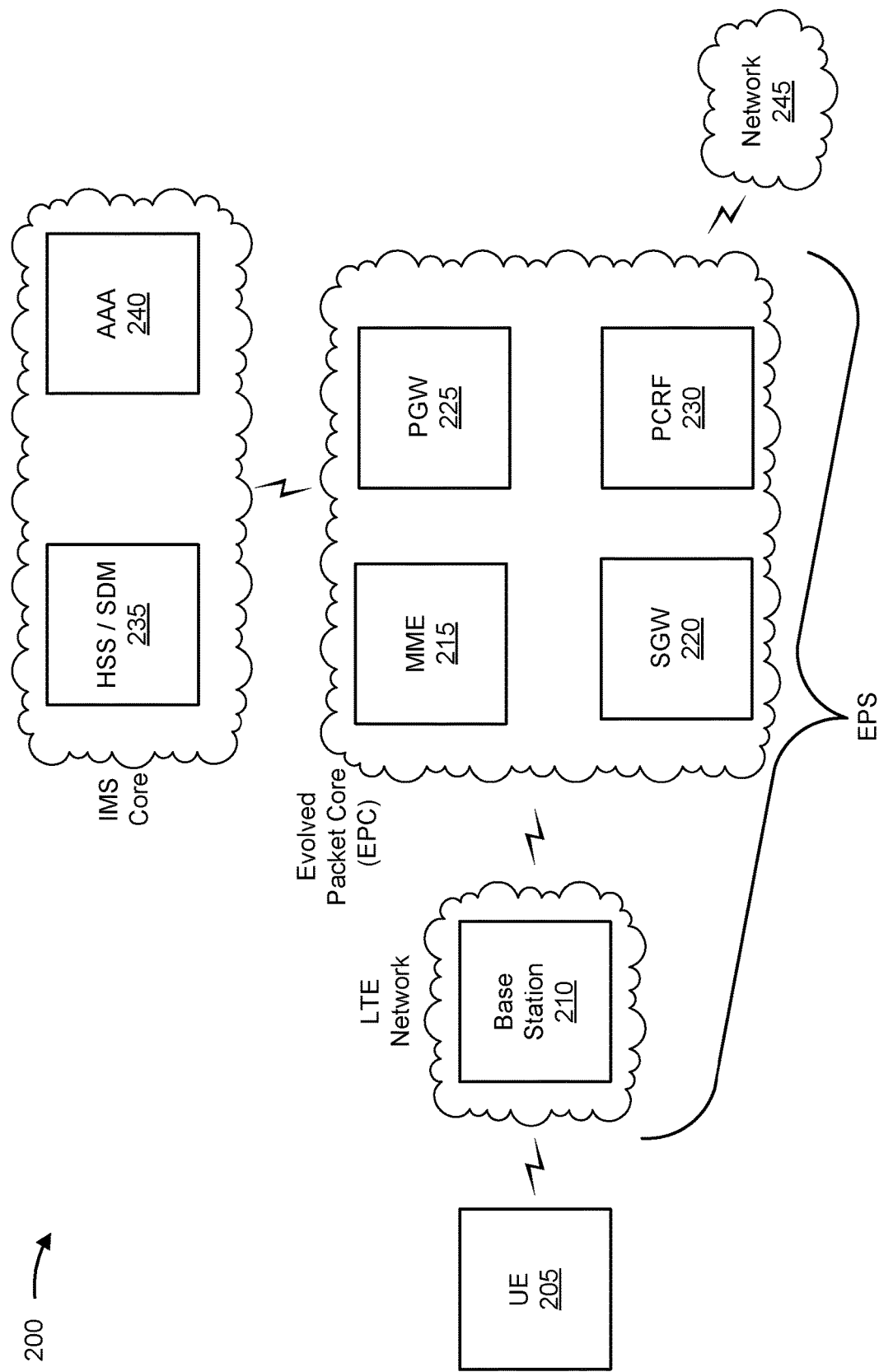
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a user equipment (UE) 205, a base station 210, a mobility management entity (MME) 215, a serving gateway (SGW) 220, a packet data network gateway (PGW) 225, a policy and charging rules function (PCRF) 230, a home subscriber server/subscriber data manager (HSS/SDM) 235, an authentication, authorization, and accounting server (AAA) 240, and/or a network 245. Devices of environment 200 may interconnect via wired connections, wireless connections, or a combination of wired and wireless connections.

Some implementations are described herein as being performed within a long-term evolution (LTE) network for explanatory purposes. Some implementations may be performed within a network that is not an LTE network, such as a fifth generation (5G) network or a third generation (3G) network.

Environment 200 may include an evolved packet system (EPS) that includes an LTE network and/or an evolved packet core (EPC) that operate based on a third-generation partnership project (3GPP) wireless communication standard. The LTE network may include a radio access network (RAN) that includes one or more base stations 210 that take the form of evolved Node Bs (eNBs) via which UE 205 communicates with the EPC. The EPC may include MME 215, SGW 220, and/or PGW 225 that enable UE 205 to communicate with network 245 and/or an Internet protocol (IP) multimedia subsystem (IMS) core. The IMS core may include HSS/SDM 235 and/or AAA 240, and may manage device registration and authentication, session initiation, etc., associated with UE 205. HSS/SDM 235 and/or AAA 240 may reside in the EPC and/or the IMS core.

UE 205 includes one or more devices capable of communicating with base station 210 and/or a network (e.g., network 245, etc.). For example, UE 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, user equipment, and/or a similar device. UE 205 may be capable of communicating using uplink (e.g., UE to base station) communications, downlink (e.g., base station to UE) communications, and/or side link (e.g., UE-to-UE) communications. In some implementations, UE 205 may include a machine-type communication (MTC) UE, such as an evolved or enhanced MTC (eMTC) UE. In some implementations, UE 205 may include an Internet of Things (IoT) UE, such as a narrowband IoT (NB-IoT) UE and/or the like.

In some implementations, UE 205 may provide a connection request (e.g., an attachment request) to base station 210. In some implementations, UE 205 may receive a connection response (e.g., an attachment response) from base station 210. In some implementations, UE 205 may receive a response (e.g., a modify bearer response) from base station 210.

Base station 210 includes one or more devices capable of communicating with UE 205 using a cellular Radio Access Technology (RAT). For example, base station 210 may include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. Base station 210 may transfer traffic between UE 205 (e.g., using a cellular RAT), other base stations 210 (e.g., using a wireless interface or a backhaul interface, such as a wired backhaul interface), and/or network 245. Base station 210 may provide one or more cells that cover geographic areas. Some base stations 210 may be mobile base stations. Some base stations 210 may be capable of communicating using multiple RATs.

In some implementations, base station 210 may perform scheduling and/or resource management for UEs 205 covered by base station 210 (e.g., UEs 205 covered by a cell provided by base station 210). In some implementations, base stations 210 may be controlled or coordinated by a network controller, which may perform load balancing, network-level configuration, and/or the like. The network controller may communicate with base stations 210 via a wireless or wireline backhaul. In some implementations, base station 210 may include a network controller, a self-organizing network (SON) module or component, or a similar module or component. In other words, a base station 210 may perform network control, scheduling, and/or network management functions (e.g., for other base stations 210 and/or for uplink, downlink, and/or side link communications of UEs 205 covered by the base station 210). In some implementations, base station 210 may include a central unit and multiple distributed units. The central unit may coordinate access control and communication with regard to the multiple distributed units. The multiple distributed units may provide UEs 205 and/or other base stations 210 with access to network 245.

In some implementations, base station 210 may provide a connection request associated with a UE 205 to MME 215. In some implementations, base station 210 may receive a connection response associated with the UE 205 from MME 215. In some implementations, base station 210 may receive a response (e.g., a modify bearer response) from MME 215. The response may include data usage information that may allow UE 205 to have access to expected data usage permissions or expanded data usage permissions.

MME 215 includes one or more devices, such as one or more server devices, capable of managing authentication, activation, deactivation, and/or mobility functions associated with UE 205. In some implementations, MME 215 may perform operations relating to authentication of UE 205. Additionally, or alternatively, MME 215 may facilitate the selection of a particular SGW 220 and/or a particular PGW 225 to serve traffic to and/or from UE 205. MME 215 may perform operations associated with handing off UE 205 from a first base station 210 to a second base station 210 when UE 205 is transitioning from a first cell associated with the first base station 210 to a second cell associated with the second base station 210. Additionally, or alternatively, MME 215 may select another MME (not pictured), to which UE 205 should be handed off (e.g., when UE 205 moves out of range of MME 215).

In some implementations, MME 215 may be configured with a field that is capable of defining a coverage area. In some implementations, a set of indicator values associated with a set of base stations 210 may be included as values of the field. In some implementations, MME 215 may receive instructions to update the field that defines the coverage area (e.g., by adding identifiers to the field, by clearing the field, and/or the like). In some implementations, MME 215 may support or have access to a data structure that associates device identifiers of UEs 205 and particular identifiers that identify users as being eligible to receive expanded data usage permissions. In some implementations, MME 215 may provide a request (e.g., a modify bearer request) to PCRF 230 (e.g., directly, using one or more other network devices as intermediaries, etc.). In some implementations, MME 215 may receive a response (e.g., a modify bearer response) from PCRF 230 (e.g., directly, using one or more other network devices as intermediaries, etc.).

SGW 220 includes one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network and may send the aggregated traffic to network 245 (e.g., via PGW 225) and/or other network devices associated with the EPC and/or the IMS core. SGW 220 may also receive traffic from network 245 and/or other network devices and may send the received traffic to UE 205 via base station 210. Additionally, or alternatively, SGW 220 may perform operations associated with handing off UE 205 to and/or from an LTE network.

PGW 225 includes one or more devices capable of providing connectivity for UE 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220 and may send the aggregated traffic to network 245. Additionally, or alternatively, PGW 225 may receive traffic from network 245, and may send the traffic to UE 205 via SGW 220 and base station 210. PGW 225 may record data usage information (e.g., byte usage), and may provide the data usage information to AAA 240.

PCRF 230 includes one or more network devices or other types of communication devices. PCRF 230 may store subscriber information, such as voice call and data rate plans or quotas for subscribers. In some cases, PCRF 230 may store, as part of the subscriber information, a particular identifier that is used to identify a user as being eligible to receive expanded data usage permissions. PCRF 230 may provide network control regarding service data flow detection, gating, Quality of Service (QoS), and/or flow-based charging. Policies and rules regarding QoS may include policies and rules instructing UE 205 and/or network elements (base station 210, SGW 220, PGW 225, etc.) to minimize packet loss, to implement a packet delay budget, to provide a guaranteed bit rate (GBR), to provide a particular latency, to reduce RF signal congestion, and/or to perform other activities associated with QoS. PCRF 230 may provide policies and rules to other network devices, such as base station 210, SGW 220, PGW 225, and/or the like, to implement network control. PCRF 230 may determine how a certain service data flow shall be treated and may ensure that subscriber plane traffic mapping and QoS is in accordance with a subscriber's profile and/or network policies.

HSS/SDM 235 includes one or more devices, such as one or more server devices, capable of managing (e.g., receiving, generating, storing, processing, and/or providing) information associated with UE 205. For example, HSS/SDM 235 may manage subscription information associated with UE 205, such as information that identifies a subscriber profile of a user associated with UE 205 (e.g., which may include a particular identifier that identifies a user as eligible for expanded data usage permissions), information that identifies services and/or applications that are accessible to UE 205, location information associated with UE 205, a network identifier (e.g., a network address) that identifies UE 205, information that identifies a treatment of UE 205 (e.g., quality of service information, a quantity of minutes allowed per time period, a quantity of data consumption allowed per time period, etc.), and/or similar information. HSS/SDM 235 may provide this information to one or more other devices of environment 200 to support the operations performed by those devices. In some implementations, HSS/SDM 235 may serve as a single, virtual data store with a centralized administration, management, and/or reporting.

AAA 240 includes one or more devices, such as one or more server devices, that perform authentication, authorization, and/or accounting operations for communication sessions associated with UE 205. For example, AAA 240 may perform authentication operations for UE 205 and/or a user of UE 205 (e.g., using one or more credentials), may control access, by UE 205, to a service and/or an application (e.g., based on one or more restrictions, such as time-of-day restrictions, location restrictions, single or multiple access restrictions, read/write restrictions, etc.), may track resources consumed by UE 205 (e.g., a quantity of voice minutes consumed, a quantity of data consumed, etc.), and/or may perform similar operations.

Network 245 includes one or more wired and/or wireless networks. For example, network 245 may include a cellular network (e.g., a 5G network, a 4G network, such as an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
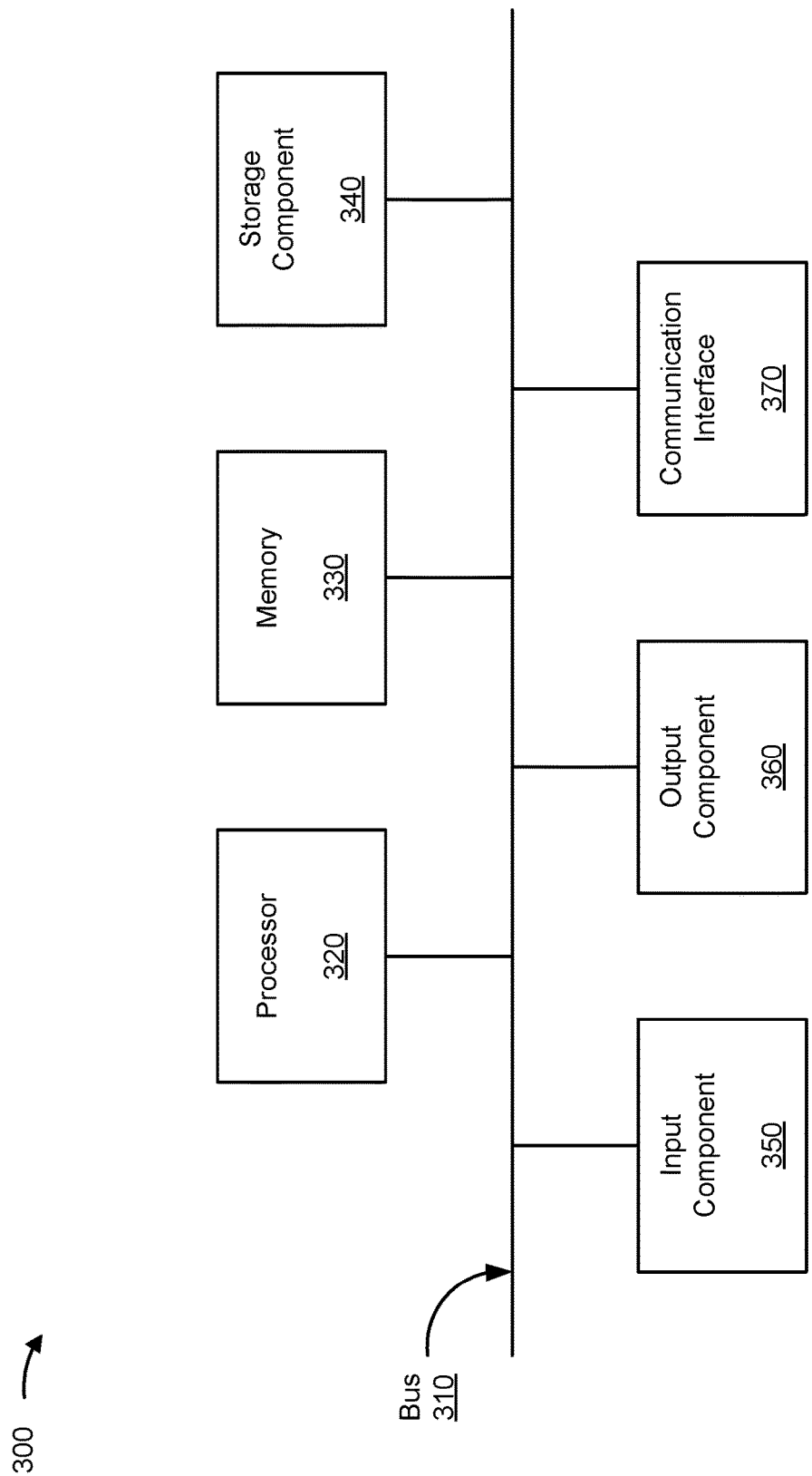
FIG. 3 is a diagram of example components of one or more devices of FIG. 2.

FIG. 3 is a diagram of example components of a device 300. Device 300 may correspond to UE 205, base station 210, MME 215, SGW 220, PGW 225, PCRF 230, HSS/SDM 235, and/or AAA 240. In some implementations UE 205, base station 210, MME 215, SGW 220, PGW 225, PCRF 230, HSS/SDM 235, and/or AAA 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
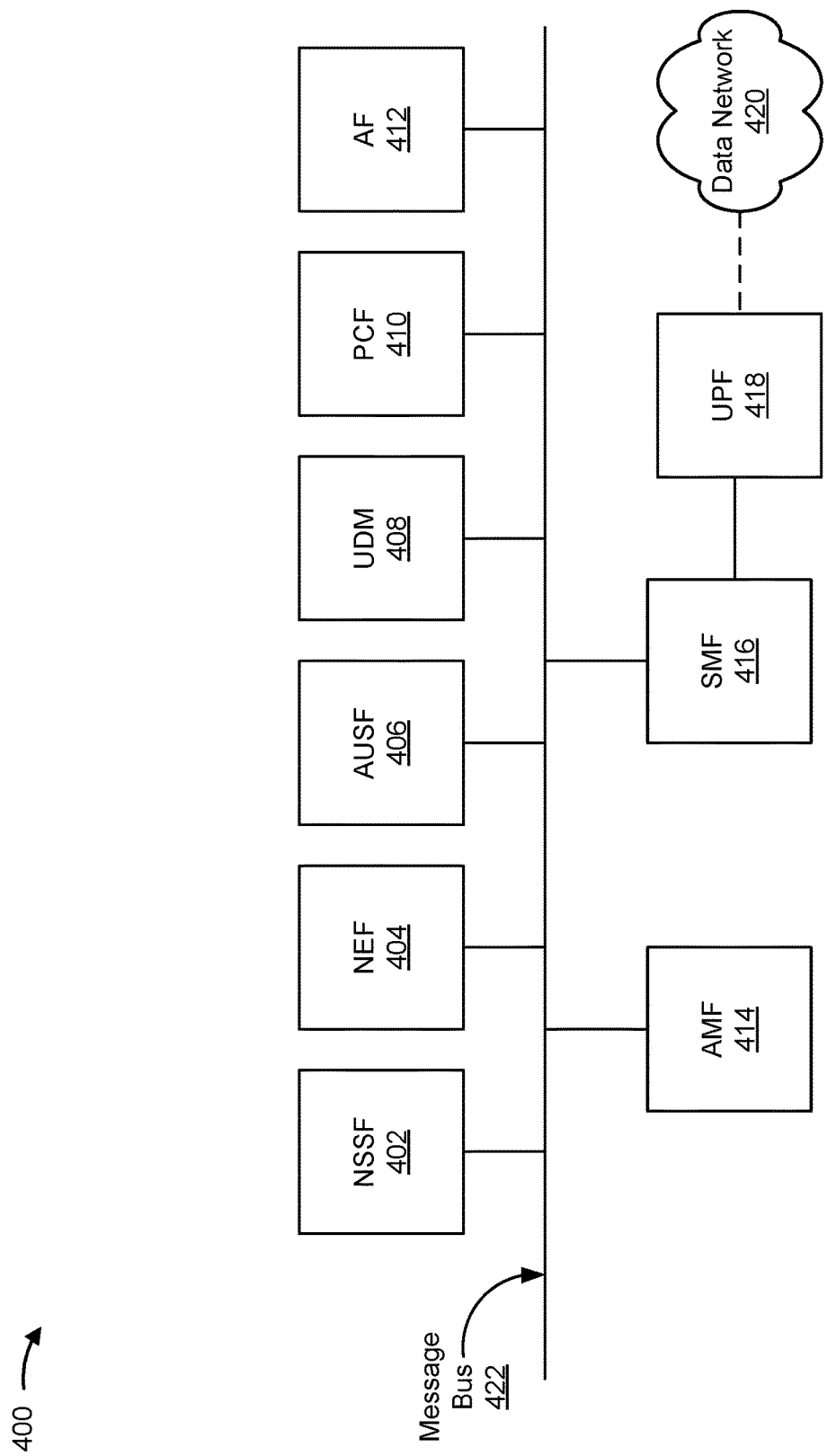
FIG. 4 is a diagram of an example functional architecture of an example core network described herein

FIG. 4 is a diagram of an example functional architecture of a core network 400 in which systems and/or methods, described herein, may be implemented. For example, FIG. 4 may show an example architecture of a 5G NG core network included in a 5G wireless telecommunications system. In some implementations, the example architecture may be implemented by a core network (e.g., a core network described with respect to FIG. 5) and/or one or more of devices (e.g., a device associated with FIG. 2 or FIG. 3). While the example architecture of shown in FIG. 4 may be an example of a service-based architecture, in some implementations, the example architecture may be implemented as a reference-point architecture.

As shown in FIG. 4, core network 400 may include a number of functional elements. The functional elements may include, for example, a network slice selection function (NSSF) 402, a network exposure function (NEF) 404, an authentication server function (AUSF) 406, a unified data management (UDM) component 408, a policy control function (PCF) 410, an application function (AF) 412, an access and mobility management function (AMF) 414, a session management function (SMF) 416, a user plane function (UPF) 418, a data network 420, and/or the like. These functional elements may be communicatively connected via a message bus 422. Each of the functional elements shown in FIG. 4 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 402 is a hardware-based element that may select network slice instances for UEs (and/or may determine network slice policies to be applied at a RAN). By providing network slicing, NSSF 402 allows an operator to deploy multiple substantially independent end-to-end networks potentially with the same infrastructure. In some implementations, each slice may be customized for different services. NEF 404 is a hardware-based element that may support the exposure of capabilities and/or events in the wireless telecommunications system to help other entities in the wireless telecommunications system discover network services.

AUSF 406 is a hardware-based element that may act as an authentication server and support the process of authenticating UEs in the wireless telecommunications system. UDM component 408 is a hardware-based element that may store subscriber data and profiles in the wireless telecommunications system. UDM component 408 may be used for fixed access, mobile access, and/or the like, in core network 400. In some implementations, UDM component 408 may perform one or more functions and/or features described as being performed by HSS/SDM 235. PCF 410 is a hardware-based element that may provide a policy framework that incorporates network slicing, roaming, packet processing, mobility management, and/or the like. In some implementations, PCF 410 may perform one or more functions and/or features described as being performed by PCRF 230.

AF 412 is a hardware-based element that may support application influence on traffic routing, access to NEF 404, policy control, and/or the like. AMF 414 is a hardware-based element that may act as a termination point for Non Access Stratum (NAS) signaling, mobility management, and/or the like. In some implementations, AMF 414 may perform one or more functions and/or features described as being performed by a mobility management entity (MME). For example, AMF 414 may perform a set of actions that provide a UE with expanded data usage permissions, in a same or similar manner as that described elsewhere herein. SMF 416 is a hardware-based element that may support the establishment, modification, and release of communications sessions in the wireless telecommunications system. For example, SMF 416 may configure traffic steering policies at UPF 418, enforce UE IP address allocation and policies, and/or the like.

UPF 418 is a hardware-based element that may serve as an anchor point for intra/inter-Radio Access Technology (RAT) mobility. UPF 418 may apply rules to packets, such as rules pertaining to packet routing, traffic reporting, handling user plane QoS, and/or the like. Data network 420 may include various types of data networks, such as the Internet, a third party services network, an operator services network, a private network, a wide area network, and/or the like. Message bus 422 represents a communication structure for communication among the functional elements. In other words, message bus 422 may permit communication between two or more functional elements.

The number and arrangement of functional elements shown in FIG. 4 are provided as an example. In practice, there may be additional functional elements, fewer functional elements, different functional elements, or differently arranged functional elements than those shown in FIG. 4. Furthermore, two or more functional elements shown in FIG. 4 may be implemented within a single device, or a single functional element shown in FIG. 4 may be implemented as multiple, distributed devices. Additionally, or alternatively, a set of functional elements (e.g., one or more functional elements) of core network 400 may perform one or more functions described as being performed by another set of functional elements of core network 400.

Figure 5:
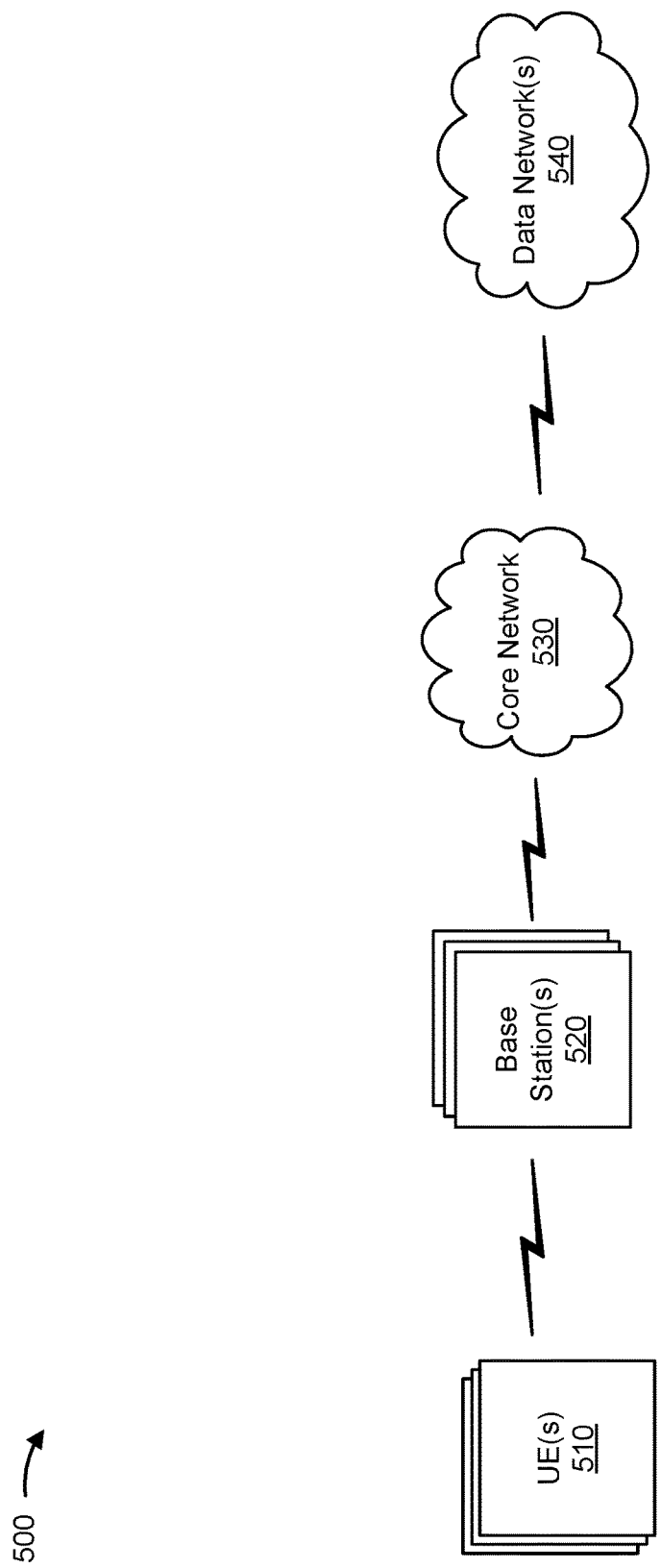
FIG. 5 is diagram of an example environment in which systems, functional architectures, and/or methods, described herein, may be implemented.

FIG. 5 is a diagram of an example environment 500 in which systems, functional elements, and/or methods, described herein, may be implemented. As shown in FIG. 5, environment 500 may include one or more UEs 510, one or more base stations 520, a core network 530, and/or one or more data networks 540. Devices of environment 500 may interconnect via wired connections, wireless connections, or a combination of wired and wireless connections.

UE 510 includes one or more devices capable of communicating with base station 520 and/or data network 540 (e.g., via core network 530). For example, UE 510 may include a wireless communications device, a radiotelephone, a personal communications system (PCS) terminal (e.g., that may combine a cellular radiotelephone with data processing and data communications capabilities), a smart phone, a laptop computer, a tablet computer, a personal gaming system, a mobile hotspot device, a fixed wireless access device, a customer premises equipment, and/or a similar device. UE 510 may be capable of communicating using uplink (e.g., UE 510 to base station 520) communications, downlink (e.g., base station 520 to UE 510) communications, and/or sidelink (e.g., UE-to-UE) communications. In some implementations, UE 510 may include a machine-type communication (MTC) UE, such as an evolved or enhanced MTC (eMTC) UE. In some implementations, UE 510 may include an Internet of Things (IoT) UE, such as a narrowband IoT (NB-IoT) UE and/or the like. In some implementations, UE 510 may be capable of communicating using multiple RATs.

Base station 520 includes one or more devices capable of communicating with UE 510 using a cellular RAT. For example, base station 520 may include a base transceiver station, a radio base station, a node B, an eNB, a gNB, a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. Base station 520 may transfer traffic between UE 510 (e.g., using a cellular RAT), other base stations 520 (e.g., using a wireless interface or a backhaul interface, such as a wired backhaul interface), and/or core network 530. Base station 520 may provide one or more cells that cover geographic areas. Some base stations 520 may be mobile base stations. Some base stations 520 may be capable of communicating using multiple RATs.

In some implementations, base station 520 may perform scheduling and/or resource management for UEs 510 covered by base station 520 (e.g., UEs 510 covered by a cell provided by base station 520). In some implementations, base stations 520 may be controlled or coordinated by a network controller, which may perform load balancing, network-level configuration, and/or the like. The network controller may communicate with base stations 520 via a wireless or wireline backhaul. In some implementations, base station 520 may include a network controller, a self-organizing network (SON) module or component, or a similar module or component. In other words, a base station 520 may perform network control, scheduling, and/or network management functions (e.g., for other base stations 520 and/or for uplink, downlink, and/or sidelink communications of UEs 510 covered by the base station 520). In some implementations, base station 520 may include a central unit and multiple distributed units. The central unit may coordinate access control and communication with regard to the multiple distributed units. The multiple distributed units may provide UEs 510 and/or other base stations 520 with access to data network 540 via core network 530.

Core network 530 includes various types of core network architectures, such as a 5G NG Core (e.g., a core network capable of being utilized by UPF 418 or other devices or components associated with FIG. 5), a long-term evolution (LTE) evolved packet core (EPC), and/or the like. In some implementations, core network 530 may be implemented on physical devices, such as a gateway, a mobility management entity, and/or the like. In some implementations, the hardware and/or software implementing core network 530 may be virtualized (e.g., through the use of network function virtualization and/or software-defined networking), thereby allowing for the use of composable infrastructure when implementing core network 530. In this way, networking, storage, and compute resources may be allocated to implement the functions of core network 530 (described in FIG. 5) in a flexible manner as opposed to relying on dedicated hardware and software to implement these functions.

Data network 540 includes one or more wired and/or wireless data networks. For example, data network 540 may include an IMS, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

FIG. 6 is a flow chart of an example process 600 for providing a user equipment (UE) that is within a coverage area with expanded data usage permissions. In some implementations, one or more process blocks of FIG. 6 may be performed by a mobility management entity (MME) (e.g., MME 215). In some implementations, one or more process blocks of FIG. 6 may be performed by another device or a group of devices separate from or including the MME, such as a user equipment (UE) (e.g., UE 205), a base station (e.g., base station 210), a serving gateway (SGW) (e.g., SGW 220), a packet data network gateway (PGW) (e.g., PGW 225), a policy and charging rules function (PCRF) (e.g., PCRF 230), a home subscriber server/subscriber data manager (HSS/SDM) (e.g., HSS/SDM 235), an authentication, authorization, and account server (AAA) (e.g., AAA 240), and/or one or more devices described in connection with FIGS. 4 and 5.

As shown in FIG. 6, process 600 may include receiving instructions to update one or more fields that define a coverage area within a network, wherein the coverage area is to be used to grant a set of user equipment (UEs) with access to expanded data usage permissions (block 610). For example, the MME (e.g., using processor 320, memory 330, input component 350, communication interface 370, and/or the like) may receive instructions to update one or more fields that define a coverage area within a network, as described above. In some implementations, the coverage area may be used to grant a set of user equipment (UEs) with access to expanded data usage permissions.

In some implementations, before receiving the instructions to update the one or more fields, the MME may receive a connection request for the UE to connect to the network. In some cases, the MME may obtain, from the other device, particular account information associated with the UE, that includes a particular identifier of the one or more particular identifiers. Additionally, the MME may analyze the account information to identify the particular identifier. Next, the MME may update a data structure to associate a device identifier of the UE and the particular identifier. Furthermore, the MME may determine that the coverage area is not active by analyzing the one or more fields. Additionally, the MME may cause, before receiving the instructions to update the one or more fields, the UE to connect to the network with data usage permissions. The data usage permissions may be data usage permissions expected by the user, data usage permissions identified in a data plan of the user, and/or the like.

In some implementations, before receiving the instructions to update the one or more fields and based on an event, the MME may cause the account information for the one or more users to include the one or more particular identifiers. The event may include an incident causing a group of first responders to enter the coverage area, and/or a service outage in at least a portion of the coverage area.

As further shown in FIG. 6, process 600 may include updating, based on receiving the instructions, the one or more fields to include a set of identifiers that are associated with a group of base stations within the coverage area (block 620). For example, the MME (e.g., using processor 320, memory 330, storage component 340, and/or the like) may update, based on receiving the instructions, the one or more fields to include a set of identifiers that are associated with a group of base stations within the coverage area, as described above.

In some implementations, after updating the one or more fields, the MME may receive a connection request for the UE to connect to the network. Additionally, the MME may obtain, from the other device, the account information that includes the particular identifier. Next, the MME may analyze the account information to identify the particular identifier. Furthermore, the MME may update a data structure to associate a device identifier of the UE and the particular identifier. In some cases, the MME may determine whether the coverage area is active by analyzing the one or more fields that have been updated.

As further shown in FIG. 6, process 600 may include determining that a UE, that is connected to the network, qualifies for the expanded data usage permissions, wherein the UE qualifies for the expanded data usage permissions based on account information associated with the UE including a particular identifier that allows the UE to utilize the expanded data usage permissions (block 630). For example, the MME (e.g., using processor 320, memory 330, storage component 340, and/or the like) may determine that a UE, that is connected to the network, qualifies for the expanded data usage permissions, as described above. In some implementations, the UE may qualify for the expanded data usage permissions based on account information associated with the UE including a particular identifier that allows the UE to utilize the expanded data usage permissions.

In some implementations, when determining that the UE qualifies for the expanded data usage permissions, the MME may use a device identifier of the UE to search a data structure that associates a corresponding device identifier with the particular identifier. In some implementations, when determining that the UE qualifies for the expanded data usage permissions, the MME may provide the device identifier to the other device to cause the other device to verify that the particular identifier is included in the account information associated with the UE and to provide an indication that the UE qualifies for the expanded data usage permissions to the device. In some implementations, when determining that the UE qualifies for the expanded data usage permissions, the MME may obtain the account information from the other device and process may the account information to determine whether the account information includes the particular identifier.

As further shown in FIG. 6, process 600 may include providing, to another device, a request for data usage information that reflects the expanded data usage permissions (block 640). For example, the MME (e.g., using processor 320, memory 330, output component 360, communication interface 370, and/or the like) may provide, to another device (e.g., the PCRF), a request (e.g., a modify bearer request) for data usage information that reflects the expanded data usage permissions, as described above.

In some implementations, when providing the request, the MME may provide the request based on determining that the account information includes the particular identifier and based on determining that the coverage area is active. For example, this may occur in situations where the UE connections to the network after the coverage area has been activated.

In some implementations, the MME may receive, from the other device, a response that includes the data usage information that reflects the expanded data usage permissions. For example, the MME may receive a modify bearer response from the PCRF that includes the data usage information that reflects the expanded data usage permissions.

As further shown in FIG. 6, process 600 may include causing the data usage information to be applied to a session associated with the UE (block 650). For example, the MME (e.g., using processor 320, memory 330, storage component 340, input component 350, output component 360, communication interface 370, and/or the like) may cause the data usage information to be applied to a session associated with the UE, as described above. As a particular example, the MME may provide the data usage information to one or more serving base stations to allow the data usage information to be applied to one or more sessions associated with the one or more UEs.

In some implementations, applying the data usage information to the session provides the UE with access to a quantity of data that is greater than a particular quantity of data identified in a data plan of the user, access to the data in a manner that is free of cost, access to the data in a manner that causes data usage to be unaffected by one or more quality of service (QoS) service restrictions identified in the data plan of the user, and/or access to the data in a manner that removes one or more data throttling restrictions.

In some implementations, the account information may include information identifying a billing postal code that is outside of the coverage area. In some implementations, the MME may cause the session to be established to allow the UE to access data in a manner indicated by the data usage information.

In some implementations, the MME may receive particular instructions to reset at least one value of at least one of the one or more fields that define the coverage area. For example, the MME may reset the one or more fields by updating the one or more fields to include null values. Additionally, the MME may provide, to the other device, a new request for particular data usage information that reflects data usage permissions. The data usage permissions may be based on a data plan of the user. Furthermore, the MME may receive, from the other device, the particular data usage information, and may cause the particular data usage information to be applied to the session associated with the UE.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, may be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, instructions to update one or more fields that define a coverage area within a network,
      wherein the coverage area is to be used to grant a set of user equipment (UEs) with access to expanded data usage permissions;
   updating, by the device and based on receiving the instructions, the one or more fields to include a set of identifiers that are associated with a group of base stations within the coverage area;
   determining, by the device, that a UE, that is connected to the network, qualifies for the expanded data usage permissions,
      wherein the UE qualifies for the expanded data usage permissions based on account information of an account associated with the UE including a particular identifier that allows the UE to utilize the expanded data usage permissions;
   providing, by the device and to another device, a request for data usage information that reflects the expanded data usage permissions; and
   causing, by the device, the data usage information to be applied to a session associated with the UE.

2. The method of claim 1, wherein applying the data usage information to the session provides the UE with at least one of:
   access a quantity of data that is greater than a particular quantity of data identified in a data plan of the user,
   access to the data in a manner that is free of cost,
   access to the data in a manner that causes data usage to be unaffected by one or more quality of service (QoS) service restrictions identified in the data plan of the user, or
   access to the data in a manner that removes data throttling limitations.

3. The method of claim 1, wherein the account information includes information identifying a billing postal code that is outside of the coverage area.

4. The method of claim 1, wherein determining that the UE qualifies for the expanded data usage permissions comprises:
   using a device identifier of the UE to search a data structure that associates a corresponding device identifier with the particular identifier that allows the UE to utilize the expanded data usage permissions, or
   providing the device identifier to the other device to cause the other device to verify that the particular identifier is included in the account information associated with the UE and to provide an indication that the UE qualifies for the expanded data usage permissions to the device.

5. The method of claim 1, further comprising:
   receiving a connection request for the UE to connect to the network;
   obtaining, from the other device, the account information that includes the particular identifier;
   analyzing the account information to identify the particular identifier;
   updating a data structure to associate a device identifier of the UE and the particular identifier;
   determining that the coverage area is not active by analyzing the one or more fields; and
   causing, before receiving the instructions to update the one or more fields, the UE to connect to the network with data usage permissions that are based on a data plan of the user.

6. The method of claim 1, further comprising:
   receiving, after updating the one or more fields, a connection request for the UE to connect to the network;
   obtaining, from the other device, the account information that includes the particular identifier;
   analyzing the account information to identify the particular identifier;
   updating a data structure to associate a device identifier of the UE and the particular identifier;
   determining that the coverage area is active by analyzing the one or more fields that have been updated; and
   wherein providing the request comprises:
      providing the request based on determining that the account information includes the particular identifier and based on determining that the coverage area is active.

7. The method of claim 1, further comprising:
   receiving particular instructions to reset the one or more fields that define the coverage area;
   updating the one or more fields to include null values;

providing, to the other device, a new request for particular data usage information that reflects data usage permissions,
  wherein the data usage permissions are based on a data plan of the user;
receiving, from the other device, the particular data usage information; and
causing the particular data usage information to be applied to the session associated with the UE.

8. A device, comprising:
one or more memories; and
one or more processors, operatively coupled to the one or more memories, configured to:
  receive instructions to update one or more fields that define a coverage area within a network,
    wherein the coverage area is to be used to grant access to expanded data usage permissions;
  update, based on receiving the instructions, the one or more fields to include a set of identifiers that are associated with a group of base stations within the coverage area;
  determine that one or more user equipment (UEs), that are connected to the network, qualify for the expanded data usage permissions,
    wherein the one or more UEs qualify for the expanded data usage permissions based on account information, for one or more users that are associated with the one or more UEs, including one or more particular identifiers that allow the one or more UEs to utilize the expanded data usage permissions;
  provide, to another device, a request for data usage information for the one or more UEs that reflect the expanded data usage permissions,
    wherein the request includes one or more device identifiers for the one or more UEs;
  receive, from the other device, a response that includes the data usage information; and
  provide the data usage information to one or more serving base stations to allow the data usage information to be applied to one or more sessions associated with the one or more UEs.

9. The device of claim 8, wherein the one or more processors, when updating the one or more fields, are configured to:
update the one or more fields based on an event.

10. The device of claim 8, wherein applying the data usage information to the one or more sessions provides the one or more UEs with access to at least one of:
  access a quantity of data that is greater than a particular quantity of data identified in a data plan of the user,
  access to the data in a manner that is free of cost,
  access to the data in a manner that is not affected by one or more quality of service (QoS) service restrictions identified in the data plan of the user, or
  access to the data in a manner that removes data throttling limitations.

11. The device of claim 8, wherein the one or more processors, when determining that a UE, of the one or more UEs, qualifies for the expanded data usage permissions, are configured to:
  use a device identifier of the UE to search a data structure that associates a corresponding device identifier with a particular identifier of the one or more particular identifiers, or
  provide the device identifier to the other device to cause the other device to verify that the particular identifier is included in the account information associated with the UE and to provide an indication that the UE qualifies for the expanded data usage permissions to the device.

12. The device of claim 8, wherein the one or more processors are further configured to:
  receive, before receiving the instructions to update the one or more fields, a connection request for a UE, of the one or more UEs, to connect to the network;
  obtain, from the other device, particular account information for a user associated with the UE, that includes a particular identifier of the one or more particular identifiers;
  analyze the particular account information to identify the particular identifier;
  update a data structure to associate a device identifier of the UE and the particular identifier;
  determine that the coverage area is not active by analyzing the one or more fields; and
  cause, before receiving the instructions to update the one or more fields, the UE to connect to the network without the expanded data usage permissions.

13. The device of claim 8, wherein the one or more processors are further configured to:
  receive, after updating the one or more fields, a connection request for a UE, of the one or more UEs, to connect to the network;
  obtain, from the other device and for a user associated with the UE, particular account information that includes a particular identifier of the one or more particular identifiers;
  analyze the particular account information to identify the particular identifier;
  update a data structure to associate a device identifier of the UE and the particular identifier;
  determine that the coverage area is active by analyzing the one or more fields that have been updated;
  wherein the one or more processors, when providing the request, are to:
    provide, to the other device, a modify bearer request associated with the UE, based on determining that the particular account information includes the particular identifier, and based on determining that the coverage area is active; and
  wherein the one or more processors, when causing the data usage information to be applied to the one or more sessions, are to:
    cause a session associated with the UE to be established to allow the UE to access data in a manner indicated by the data usage information.

14. The device of claim 8, wherein the one or more processors are further configured to:
  receive particular instructions to reset at least one of the one or more fields of the coverage area,
    wherein the reset is to cause at least a portion of the coverage area to no longer provide the expanded data usage permissions;
  update at least one of the one or more fields to include a null value;
  provide, to the other device, a new request for particular data usage information that reflects data usage permissions,
    wherein the new request applies to particular UEs that are in the portion of the coverage area that is to no longer provide the expanded data usage permissions;
  receive, from the other device, the particular data usage information; and cause the particular data usage information to be applied to sessions associated with the particular UEs.

15. A non-transitory computer-readable medium storing instructions, the instructions comprising:
one or more instructions that, when executed by one or more processors of a device, cause the one or more processors to:
receive instructions to update one or more fields that define a coverage area within a network,
wherein the coverage area is to be used to grant a set of user equipment (UEs) with access to expanded data usage permissions;
update, based on receiving the instructions, the one or more fields to include a set of identifiers that are associated with a group of base stations within the coverage area;
receive a connection request for a UE to connect to the network;
determine that the UE qualifies for the expanded data usage permissions based on account information associated with the UE including a particular identifier that allows the UE to utilize the expanded data usage permissions;
obtain data usage information that reflects the expanded data usage permissions; and
cause a session to be established for the UE in a manner that applies the data usage information.

16. The non-transitory computer-readable medium of claim 15, wherein the instructions to update the one or more fields are received based on an event, and
wherein the event includes at least one of:
an incident causing a group of first responders to enter the coverage area, or
a service outage in at least a portion of the coverage area.

17. The non-transitory computer-readable medium of claim 15, wherein the account information includes information identifying a billing postal code that is outside of the coverage area.

18. The non-transitory computer-readable medium of claim 15, wherein applying the data usage information to the session provides the UE with access to at least one of:
access a quantity of data that is greater than a particular quantity of data identified in a data plan of the user,
access to the data in a manner that is free of cost,
access to the data in a manner that is not affected by one or more quality of service (QoS) service restrictions identified in the data plan of the user, or
access to the data in a manner that removes data throttling limitations.

19. The non-transitory computer-readable medium of claim 15, wherein the one or more instructions, that cause the one or more processors to determine that the UE qualifies for the expanded data usage permissions, cause the one or more processors to:
provide a device identifier of the UE to another device to cause the other device to verify that the particular identifier is included in the account information associated with the UE and to provide an indication that the UE qualifies for the expanded data usage permissions to the device, or
obtain the account information from the other device and process the account information to determine whether the account information includes the particular identifier.

20. The non-transitory computer-readable medium of claim 15, wherein the one or more instructions, when executed by the one or more processors, further cause the one or more processors to:
receive particular instructions to reset the one or more fields that define the coverage area;
update the one or more fields to include null values;
obtain particular data usage information that reflects data usage permissions that are based on a data plan of the user; and
cause the particular data usage information to be applied to the session associated with the UE.

* * * * *